Patented Oct. 3, 1939

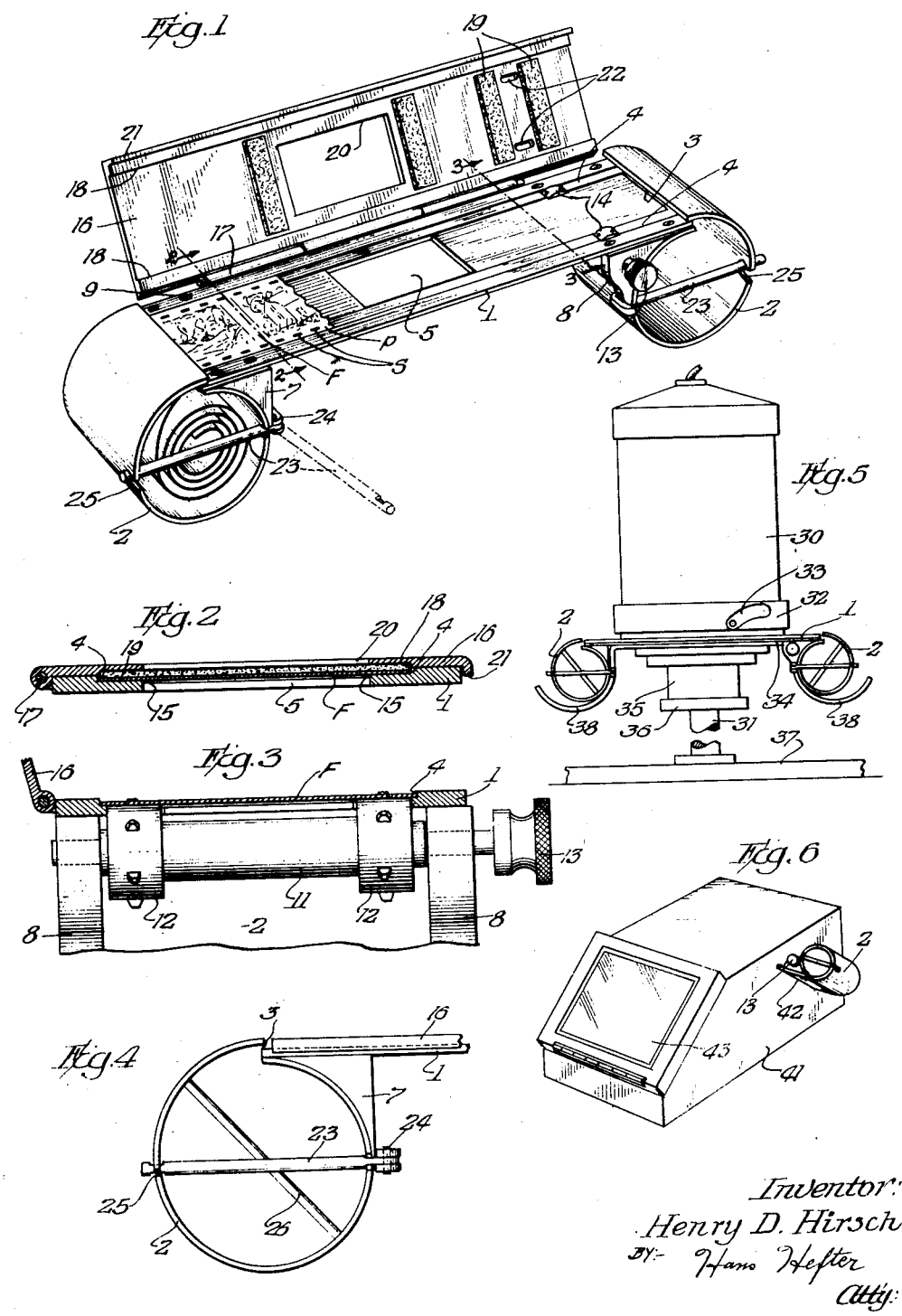

2,174,660

UNITED STATES PATENT OFFICE 2,174,660

FILM FEEDING DEVICE FOR PROJECTION APPARATUS

Henry D. Hirsch, Chicago, Ill.

Application November 21, 1938, Serial No. 241,605

2 Claims. (Cl. 88—28)

This invention relates to improvements in film feeding devices for projection apparatus.

It is an object of the invention to provide a device by means of which a film carrying a series of pictures may manually be fed longitudinally in either direction over any desired distance without requiring the operator to grip the film and to maintain it in its predetermined path.

It is another object of the invention to provide an attachment particularly suitable for photographic enlargers by means of which the film may be fed step by step to bring successive pictures on the film into proper position for enlarging, and for retaining automatically the film in any position to which it has been set.

It is also an object of the invention to provide an attachment for confining a portion of the film during its movement within a certain rectilinear path in a single plane to facilitate and accelerate the movement of any desired picture on the film into the optical axis of the projection device and for retaining the film firmly in this adjusted position while the optical equipment of the projecting device may be adjusted to proper focus.

Another object of the invention is to provide an attachment in the form of a self-contained structure which can easily be united with or removed from a projection device, as for instance, a photographic enlarger, and which will permit selective intermittent feeding of the film without requiring the operator to grip or touch the film with his fingers, at the same time preventing the coils of the film from slipping in axial direction or uncoiling out of the film supports usually provided on enlargers.

With these and numerous other objects in view, an embodiment of the invention has been illustrated in the accompanying drawing to which reference is made in the following specification.

In the drawing:

Fig. 1 is a perspective view of the attachment in open condition;

Fig. 2 is on a larger scale a transverse section of the device in operative condition, about on line 2—2 of Fig. 1;

Fig. 3 shows a similar transverse section about on line 3—3 of Fig. 1;

Fig. 4 is a detail of the end portion of the attachment, and

Fig. 5 shows the attachment in front elevation in combination with a photographic enlarger.

Fig. 6 shows perspectively another type of printing machine for photographic purposes.

In projection apparatus in which a photographic film is to be advanced slowly and at irregular intervals, as contrasted with cinematographic apparatus, it has been customary to provide a film guideway within which the film is advanced while the optical equipment is spaced from the film and to bring the optical equipment to operative condition after the film had temporarily been arrested in a position for projection.

The manipulation of the film by the fingers frequently proved injurious to the emulsion, particularly in making enlargements. The operator must necessarily put the printing paper after its exposure into the various solutions required for development and fixation, and then must return to the enlarger for selecting the next picture on the film to be enlarged. After having had his fingers in the various solutions, it was always necessary to thoroughly dry the hands before touching the film again in order to avoid injury to the film. These and numerous other drawbacks of the ordinary projection device are to be avoided in the present attachment.

The attachment, therefore, comprises a self-contained structure, including a guide plate 1 and a pair of film supports 2, one at each end of the plate. Each film support preferably is made up as an approximately tubular part, just sufficiently long to hold the end coils of a film and permit the film to pass from the interior of the support 2 through a slot 3 onto the plate 1.

In order to maintain the film F in proper alinement with the optical equipment, the plate is provided on its top surface with means engaging opposite longitudinal edges of the film. These means are shown as a pair of shoulders 4 spaced transversely a distance corresponding to the width of the film, whereby any lateral displacement of the film during its passage over the plate 1 is prevented. The plate also is provided in its central portion with an aperture 5 corresponding in size and shape to the picture area of any picture on the film. For the purpose of projecting any desired picture, the film is moved longitudinally until the desired picture is in registry with the opening 5.

The film as used in modern miniature cameras is provided with longitudinal marginal portions p free of sensitized emulsion and in which sprocket holes s are provided for feeding the film intermittently through the camera. The same sprocket holes s are utilized for intermittently feeding through the attachment of the present invention. Owing to the provision of the longitudinal shoulders 4 on the guideway, the pictures on the film can properly be centered lengthwise and transversely with respect to the opening 5 in the plate 1, permitting the projection of each picture in proper position after adjustment of the film.

The plate 1 in the form of a substantially flat rigid strip of metal is connected with the near-tubular supports 2 by pairs of brackets 7, 8 which are secured by brazing, welding or the like to the supports 2 and which have flat top surfaces on which the plate 1 rests. The plate may be detachably secured to these brackets by screws 9 or other fastening means. Hence, it is feasible upon detachment of the film coil supports 2 from the plate 1 to manually feed relatively short and approximately straight strips of film through the guideway in the usual manner.

In order to advance the film longitudinally through the guideway, the pair of brackets 8 connected with one of the film coil supports 2 serves as carrier for the film feeding means. As shown in Fig. 3, a shaft 11 is rotatably supported in the brackets 8, and is provided on an enlarged portion between the brackets with sprockets 12. The sprockets are spaced axially on the shaft sufficiently to permit the teeth thereon to engage the sprocket holes s, and the teeth on the sprockets are circumferentially spaced in accordance with the longitudinal spacing of the sprocket holes in each series on the film. Shaft 11 is extended from one of these bearing brackets 8 outwardly and is provided at the projecting end with a knob 13.

The guide plate 1 has smaller apertures 14 spaced from each other a distance equal to the spacing of the series of sprocket holes s on the film, and the teeth on the sprockets 12 are adapted to project through these holes 14 to enter the sprocket holes, whereby upon rotation of the knob 13, the film may be fed in either direction and adjusted until the selected picture thereon is in registry with the window or opening in the guideway, and all these operations can be carried out without the film itself being touched by hand.

The plate 1 is, furthermore, provided with longitudinal shallow shoulders 15 spaced transversely a distance equal to the width of the emulsion area of the film, so that the latter is frictionally supported only on the marginal zones p while it is being moved forward or backward. The shoulders 15 have a height approximately equal to the thickness of the film.

For the purpose of maintaining the film in close overlying relation to the top surface of the guideway during the adjusting movement or during projection, the attachment comprises also a cover plate 16 longitudinally hinged at 17 at one edge of plate 1 and also equipped with longitudinal shoulders spaced (18) from each other transversely a distance about equal to the width of the film. In order to place the film yieldingly flat against the top surface of the guideway, the cover 16 is provided with a plurality of strips 19 of soft material, as velvet, or the like, engaging the top surface of the film when the cover is in closed position. An opening 20 corresponding in size and shape to the picture area of the film is provided in the plate 16 to register with opening 5 when the cover is closed. The cover also is advisably equipped with a longitudinal lip 21 at the free edge thereof to locate it in a predetermined fixed relation with respect to the plate 1 when moved to closing position.

This relation is determined by the registry of the opening 20 in the cover 16 with the opening 5 in the guide plate 1. The marginal reinforcements formed by shoulders 18 on the cover impart sufficient weight to the cover 16 to permit the same to drop to operative position, as shown in Fig. 2, after it has been swung in direction towards the guide plate beyond a right angle position thereto, and the lip 21 on the cover plate 16 will then be in engagement with the front edge of the guideway, thereby assuring the proper registry of the aperture 20 in the cover with the aperture 5 in the guideway. This relation also is assured by selecting a relatively long hinge 17 for pivotally connecting the cover plate 16 with the guide plate 1. The cover plate 16, furthermore, is provided with smaller openings 22 suitably located to permit the teeth of the sprockets 12 which have passed through the sprocket holes s in the film to move longitudinally of the cover without exerting any lifting effect on the same.

The film as used in miniature cameras and the like is extremely smooth and very resilient. The coils of the film have a tendency to slip out of the supports 2 in which the coiled ends of the films rest. In order to prevent this movement at the coiled ends while at the same time permitting the film to be inserted into the attachment in a direction at right angle to the longitudinal axis of the same, the supports 2 are provided with gate bars 23 pivotally connected at 24 to the front edges of the supports and adapted to be swung to open position, as shown in dotted lines in Fig. 1, whereby the coil of the film may be placed into the respective support. Slippage of the coils from the support is prevented by moving the gate bar 23 to full line position into a notch 25 also provided in the front edge of the support. At the opposite end of each support 2, a similar stop bar 26, not necessarily movable, may be located, whereby upon inserting the film coil from one end insertion of the film to excessive depth is prevented.

The entire self-contained structure is particularly adapted for combination with an enlarger, as shown for instance in Fig. 5. The lamp housing 30 of the enlarger is usually supported for vertical adjustment on an upright post 31 and carries a movable condenser mount 32 at the lower end provided with means, for instance, in the form of a small lever or crank 33, for raising and lowering the condenser mount with respect to a platform 34 also adjustably supported on the post 31. This platform usually forms the top element of the lens mount 35 in which the lens indicated by a carrier ring 36 in Fig. 5 may be adjusted to permit the picture projected upon the base-board 37 to be sharply focussed thereon. The platform 34 on which the film travels in most enlargers terminates in arcuate strips of metal or coil holders 38 in one of which the coil is positioned in order to permit the film to be gradually drawn into the other holder in accordance with the projection work. It happens very frequently that the coils slip from these depressed film holders; the operator then has to straighten out the film again and begin the focussing operation anew. In these enlargers the operator manually advances the film by carefully gripping its edges and shifting it to place the desired picture thereon into the optical axis of condenser and lens. This operation had to be carried out with hands which short time before had been used in various photographic solutions.

The self-contained structure forming the subject matter of the present invention can easily be removably positioned on the platform 34 of any enlarger and will eliminate the necessity of touching the film during enlargement work and will at the same time prevent the accidental release of the coils from the supports at the end of the platform.

In the printing machine shown in Fig. 6, the attachment of the present invention may be positioned with its guideway inside the housing 41 which forms the principal part of the machine. In this type of machines the source of light is located in such manner as to illuminate the film which may be fed transversely of the housing 41 between glass plates, not illustrated, a transverse slit 42 extending for this purpose through the housing. Here also, as shown, the attachment can be inserted in this slit and the projection will furnish an image in the plane 43 in which in some suitable manner, as customary in machines of this character, the paper to be printed is positioned. Machines of this type are utilized for enlarging films of one certain size to furnish prints of another certain size.

I claim:

1. In a device of the character described, the combination of a guide plate for a picture film, the plate having an opening corresponding in size and shape to the size and shape of a picture on the film, means in the plate for maintaining the film in predetermined relation transversely on the plate, said means being adapted to engage longitudinal edges of a film on the plate, a cover plate hingedly connected with the guide plate and provided with an opening adapted to register with the opening in the guide plate when the cover is in closed position, means on the cover plate for yieldingly maintaining the film in operative position transversely of the plane of the guide plate and in engagement with the first mentioned means, and means on the cover plate for aligning it with the guide plate when moved to closing position said guide plate and cover plate forming a self-contained structure adapted to be removably inserted between the condenser mount and the platform of a projecting mechanism.

2. In combination with a guide plate for a picture film having an opening corresponding in size and shape to the size and shape of a picture on the film, longitudinally extending shoulders on said guide plate spaced from each other transversely a distance corresponding to the width of the film, a cover plate, means for hingedly connecting said cover plate to said guide plate along a longitudinal edge of the guide plate, marginal longitudinal reinforcements on the cover plate adapted to constrain it for movement in a certain direction from right angle position with respect to the guide plate, the cover plate being provided with an opening adapted to register with the opening in the guide plate when the cover plate is moved to closed position, and an overhanging angular projection on the cover plate extending from one of said reinforcements and adapted to engage frictionally the edge of the guide plate opposite that edge on which the hinge for the cover plate is secured, film pockets removably secured to the ends of the guide plate on the face opposite that on which the cover plate overlies the guide plate, said guide plate, cover plate and film pockets forming a self-contained structure with the cover plate and guide plate being adapted for insertion between the condenser mount and the platform of a projecting mechanism.

HENRY D. HIRSCH.